(12) United States Patent
Moore et al.

(10) Patent No.: US 7,424,503 B2
(45) Date of Patent: Sep. 9, 2008

(54) PIPELINED ACCUMULATORS

(75) Inventors: George Stennis Moore, Veradale, WA (US); John Albert Snodderley, Post Falls, ID (US); Howard Eugene Hilton, Snohomish, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 878 days.

(21) Appl. No.: 10/677,995

(22) Filed: Oct. 1, 2003

(65) Prior Publication Data

US 2005/0132164 A1   Jun. 16, 2005

(51) Int. Cl.
*G06F 7/38* (2006.01)
(52) U.S. Cl. ...................................... 708/490
(58) Field of Classification Search .................. 708/490
See application file for complete search history.

(56) References Cited

U.S. PATENT DOCUMENTS

| | | | |
|---|---|---|---|
| 3,978,323 A * | 8/1976 | Mecklenbrauker et al. .. | 708/306 |
| 5,010,509 A * | 4/1991 | Cox et al. ................... | 708/511 |
| 6,138,136 A * | 10/2000 | Bauer et al. ................. | 708/501 |

OTHER PUBLICATIONS

Fang Lu, Henry Samueli, Jiren Yuan and Christer Svensson—"A 700-MHz 24-b Pipelined Accumulator In 1.2 um CMOS For Application As A Numerically Controlled Oscillator": IEEE Journal Of Solid-State Circuits, vol. 28, No. 8, Aug. 1993; pp. 878-886.

Edward Merlo, Kwang-Hyun Baek, Myung-Jun Choe—"Exponential Split Accumulator For High-Speed Reduced Area Low-Power Direct Digital Frequency Synthesizers"; Rockwell Scientific Company, 1049 Camino dos Rios, Thousand Oaks, CA 91360; pp. 249-252.

Matthew Thompson—"Low-Latency, High-Speed Numerically Controlled Oscillator Using Progression-Of-States Technique"; IEEE Journal Of Solid-State Circuits, vol. 27, No. 1, Jan. 1992; pp. 113-117.

* cited by examiner

*Primary Examiner*—Tan V Mai

(57) ABSTRACT

Pipelined digital accumulators. Parallel digital accumulators for use in digital signal processing are improved through pipelining. An accumulator is partitioned into a plurality of pipelined stages, and the pipeline delay is used to reduce the effect of carry propagation through the accumulator. While input and output delay registers are used in the accumulator partitions, the output delay registers are not needed if the results of those partitions are not needed in subsequent stages of computation. If phase coherence is not needed, input delay registers may not be needed on accumulator partitions. In the limiting case of one bit per partition, the effective speed of the pipelined accumulator is equivalent to the speed of a single bit accumulator stage.

12 Claims, 5 Drawing Sheets

PIPELINED ACCUMULATORS

BACKGROUND OF THE INVENTION

1. Field of the Invention

The present invention pertains to the art of digital accumulators, particularly for hardware architectures for high-speed digital accumulators used in digital signal processing.

2. Art Background

A key element in many signal processing systems is the digital accumulator (digital integrator). Examples include phase accumulators for Numerically Controlled Oscillators (NCOs), and integrators such as those used in Cascaded Integrator-Comb filters. The device is composed of a register and an adder in a feedback configuration. As the number of symbols (one or more bits or the equivalent of one or more bits in non-binary systems) increases, the maximum clock rate that may be realized generally decreases with the primary limitation being the carry propagation requirements of the adder. This can be a serious constraint on the achievable speed for very wide accumulators. The feedback nature of the structure suggests that a common technique to increase the speed of feed-forward structures, pipelining, may not be employed. Designers in the past would generally employ various carry speedup methods, but the amount of speedup achievable is limited without large increases in gate count.

What is needed is a method for speeding up digital accumulators.

SUMMARY OF THE INVENTION

The performance of parallel digital accumulators for use in digital signal processing is improved through pipelining. An accumulator is partitioned into a plurality of pipelined stages, and the pipeline delay is used to reduce the effect of carry propagation through the accumulator. While input and output delay registers are used in the accumulator partitions, the output delay registers are not needed if the results of those partitions are not needed in subsequent stages of computation. If phase coherence is not needed, input delay registers may not be needed on accumulator partitions. In the limiting case of one bit per partition, the effective speed of the pipelined accumulator is equivalent to the speed of a single bit accumulator stage.

BRIEF DESCRIPTION OF THE DRAWINGS

The present invention is described with respect to particular exemplary embodiments thereof and reference is made to the drawings in which.

DETAILED DESCRIPTION

Figure 1:
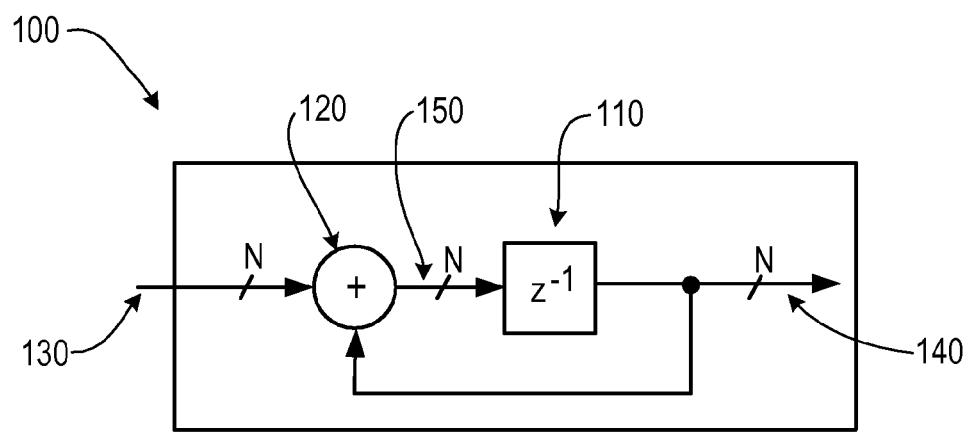
FIG. 1 shows a z-domain representation of a digital accumulator according to the prior art.

As the number of bits in a digital accumulator increase, the maximum clock rate that may be realized decreases. The primary cause of this decrease is the carry propagation time for the adder. While various carry-lookahead techniques are known to the art, their application yields large logic structures and excessive gate counts, especially as the number of bits in the adder increase. The z-domain representation of a typical digital accumulator 100 is shown in FIG. 1. Register 110 provides parallel storage for the desired width of the accumulator. The output 140 of register 110 is one input to parallel adder 120. The other input to adder 120 is parallel input 130. The output 150 of adder 120 is gated into register 110 by a clock (not shown).

Figure 2:
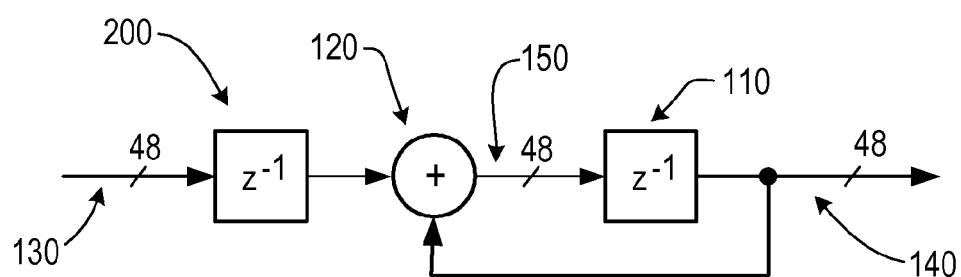
FIG. 2 shows a digital accumulator with latency.

According to the present invention, the pipelined accumulator is derived by first considering the accumulator of FIG. 2. The indicated width of 48 bits is arbitrary and used as an example only. Register 200 introduces a one clock period latency.

Figure 3:
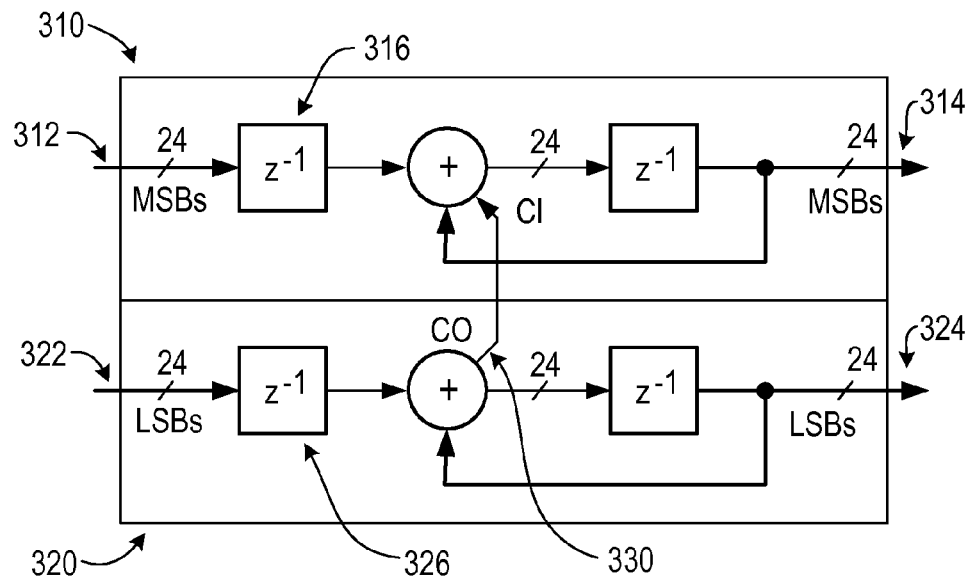
FIG. 3 shows a decomposed digital accumulator.

The 48 bit accumulator of FIG. 2 is decomposed as shown in FIG. 3 to an upper accumulator 310 handling the 24 most significant bits (MSBs) input 312 and output 314, and a lower accumulator 320 handling the 24 least significant bits (LSBs) input 322 and output 324. The partitioning into 24-bit sections is arbitrary; any partiton is allowable. MSB inputs 312 are delayed 316, and LSB inputs 322 are delayed 326 prior to being passed to their respective adders.

Note that in this decomposition, the only communication between upper accumulator 310 and lower accumulator 320 is the single-bit carry signal 330.

Figure 4:
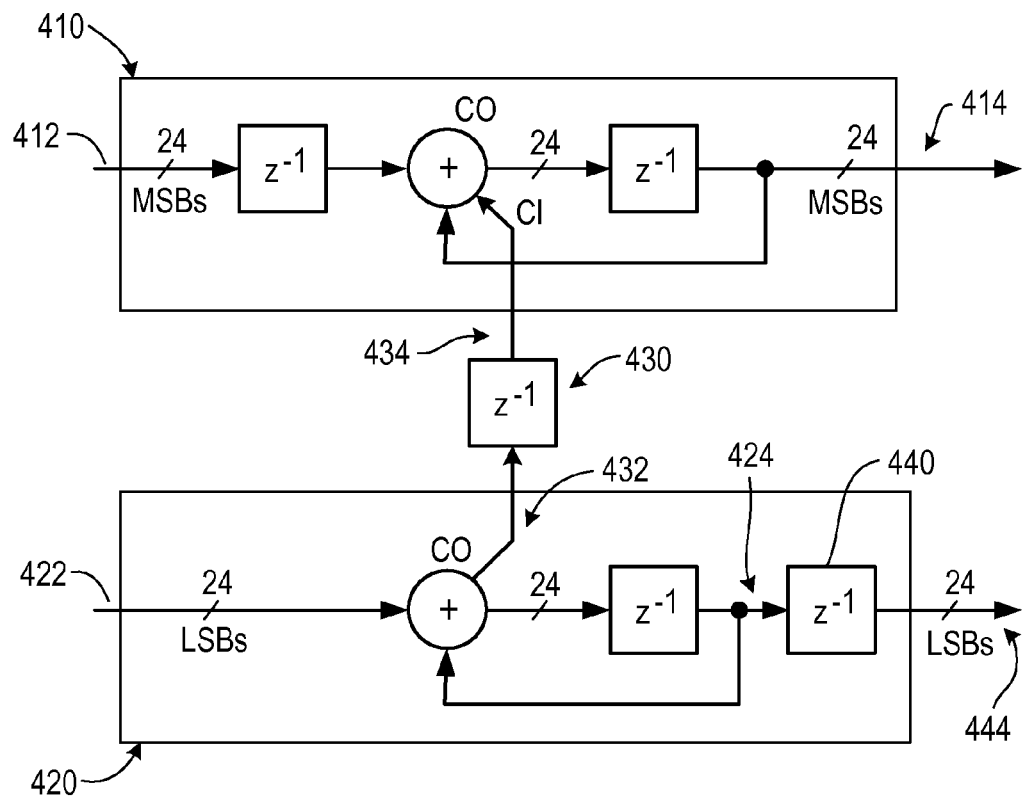
FIG. 4 shows a first pipelined digital accumulator.

According to the present invention, as shown in FIG. 4, input delay 326 of FIG. 3 is moved through the block to its two outputs, delaying 430 carry output 432 which becomes carry input 434 to upper accumulator 410, and delaying 440 lower accumulator output 424 to provide delayed output 444.

This restructuring according to the present invention has not changed the input-output relationship from that shown in FIG. 2. However, register 430 has broken the carry chain, and the overall system can now produce a full 48-bit parallel result operating at the rate of a 24-bit adder, where in FIG. 2 the overall system was limited by the speed of the single 48-bit adder.

While FIG. 4 shows a decomposition into two partitions of 24 bits, this process of decomposition can continue, with additional latencies added. For example, decomposition may be done in multiple 4-bit or 8-bit partitions. At the limit of this decomposition, shown in FIG. 5, each partition contains only a one-bit full adder and a one-bit register. Ultimately, a pipelined accumulator according to the present invention can operate at a speed limited only by this basic element. The number of partitions employed determines the amount of latency required.

Figure 5:
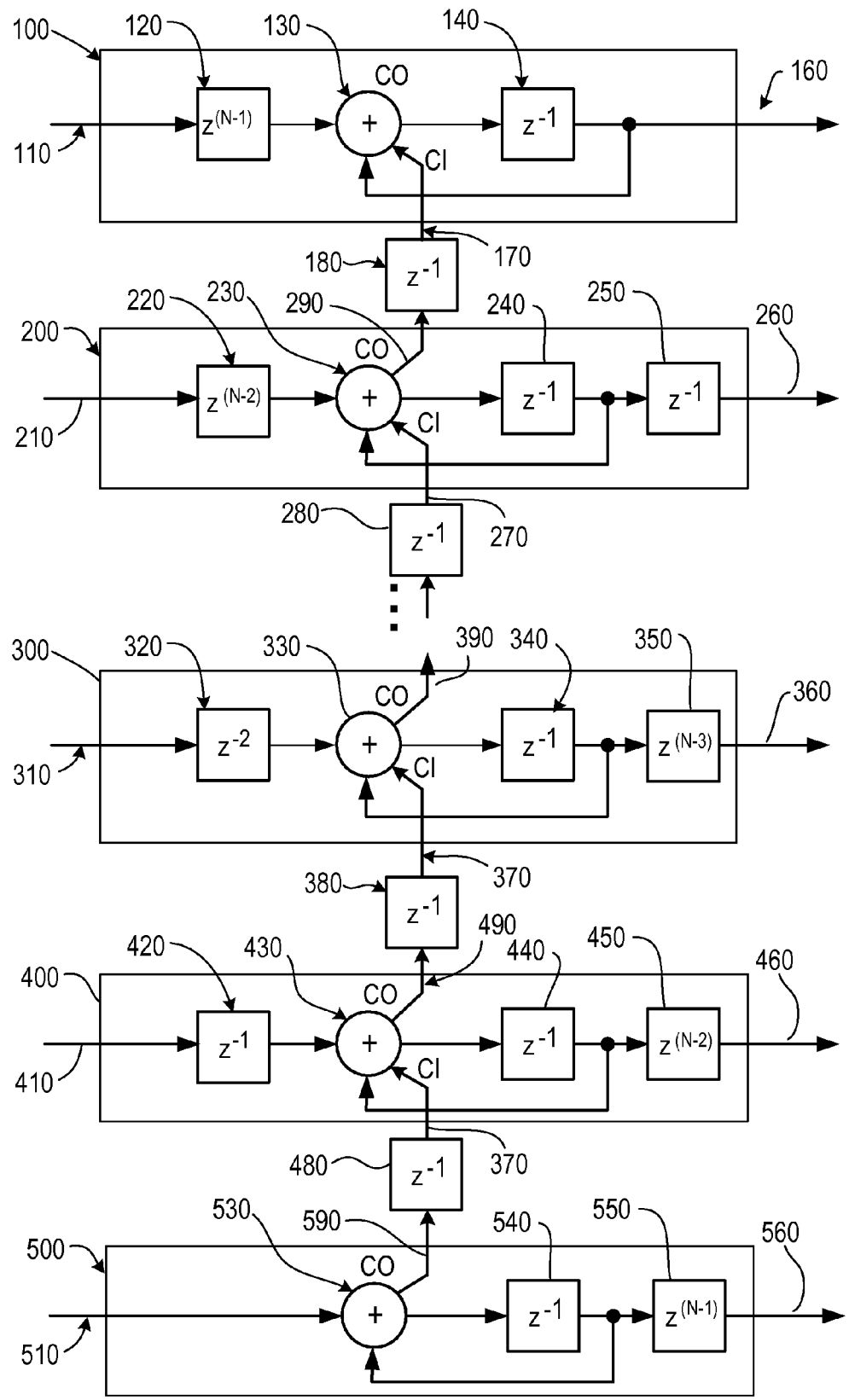
FIG. 5 shows a second pipelined digital accumulator.

FIG. 5 shows an accumulator of N partitions in the range 0 to N−1. The total latency through the accumulator, and through each partition is N periods. While FIG. 5 shows each partition as a single bit, each partition may represent a plurality of bits. Parallel inputs are applied to input lines 110 (most significant), 210, 310, 410, and 510 (least significant). Parallel outputs are presented at output lines 160 (most significant), 260, 360, 460, and 560 (least significant).

Examining the most significant partition 100 of FIG. 5, input 110 feeds input delay register 120, which delays input 110 for (N−1) periods and feeds adder 130. The output of adder 130 feeds output register 140 which provides a one period delay. Since input delay register 120 provides a delay of (N−1) periods, and output register 140 provides a delay of 1 period, no additional output delay is needed to present an N period total delay to output 160. Carry input 170 to adder 130 is provided by register 180. While most significant partition 100 is shown as a single bit, it equally well represent multiple bits, or a nonbinary representation.

Next-most significant partition 200 has input 210 feeding input delay register 220 which provides (N−2) periods of delay and feeds adder 230. The output of adder 230 feeds output register 240, which provides a one period delay. Since a total of N periods of delay are required, output delay register 250 is needed to provide 1 unit of delay to output signal 260. Carry output 290 from adder 230 feeds register 180, providing the carry input signal to adder 130. Carry input 270 for adder 230 comes from register 280, which in turn is driven by the carry output signal of the next most significant partition.

Turning now to the least significant partitions 300, 400, 500 of FIG. 5, the overall requirement is for a latency of N periods between input and output. Least significant partition 500 has zero input delay, and no input delay register. Output register 540 provides 1 period of delay, so output delay register 550 is needed to provide (N−1) periods of delay to output signal 560. Next partition 400 has input delay 420 of 1 period and output delay 450 of (N−2) periods. Partition 300 has input delay 320 of 2 periods and output delay 350 of (N−3) periods. The carry chain begins with carry out signal 510 from adder 530 which is held and delayed by register 480, feeding carry in 470 of adder 430.

Figure 6:
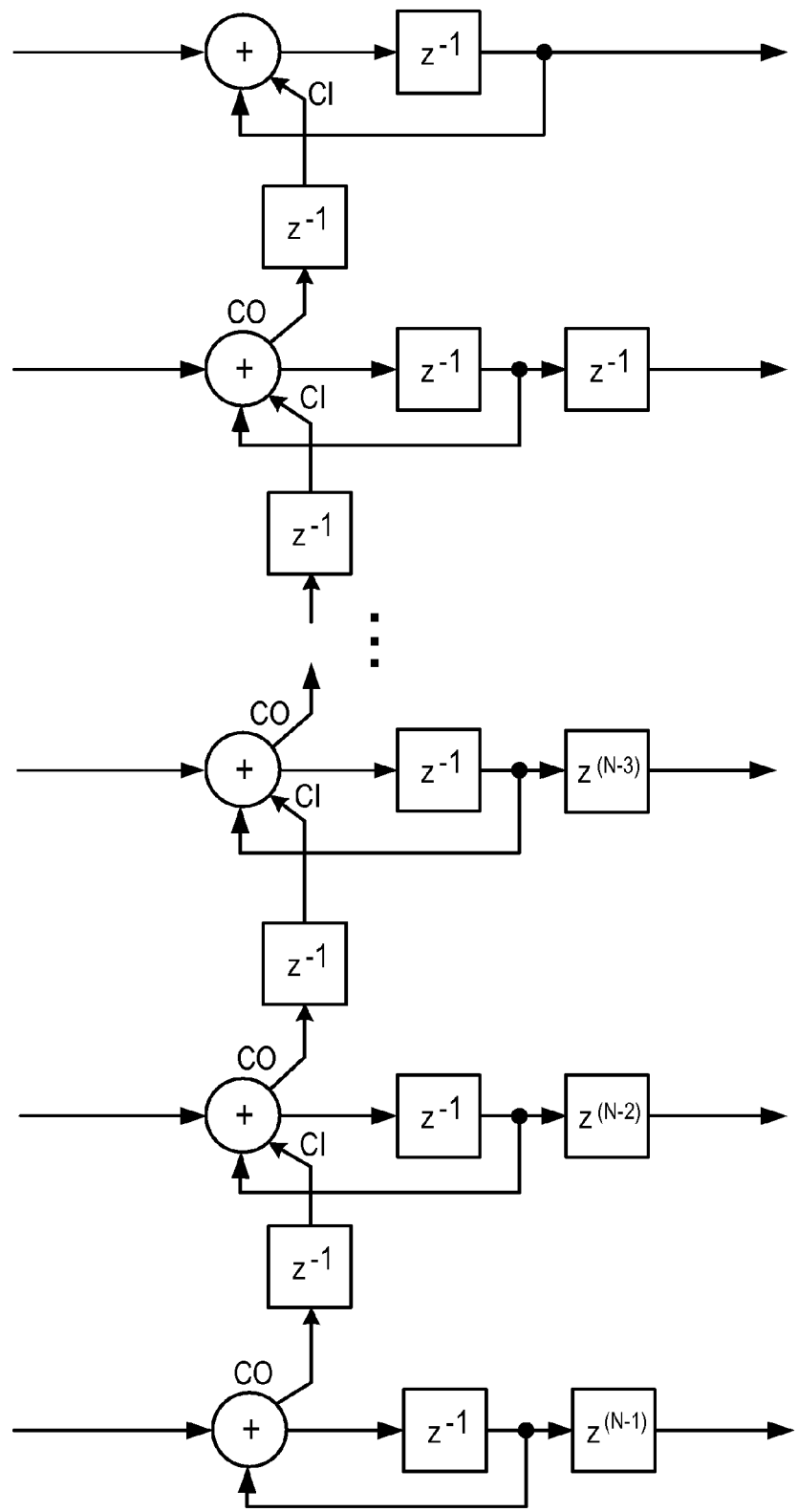
FIG. 6 shows a third pipelined digital accumulator.

The input delay registers 120, 220, 320, 420 of FIG. 5 are needed to maintain phase coherence in applications such as numerically controlled oscillators (NCOs). Where such phase coherence may be sacrificed, for example when an accumulator according to the present invention is used in a frequency-hopping system, these may be eliminated, as is shown in FIG. 6.

Figure 7:
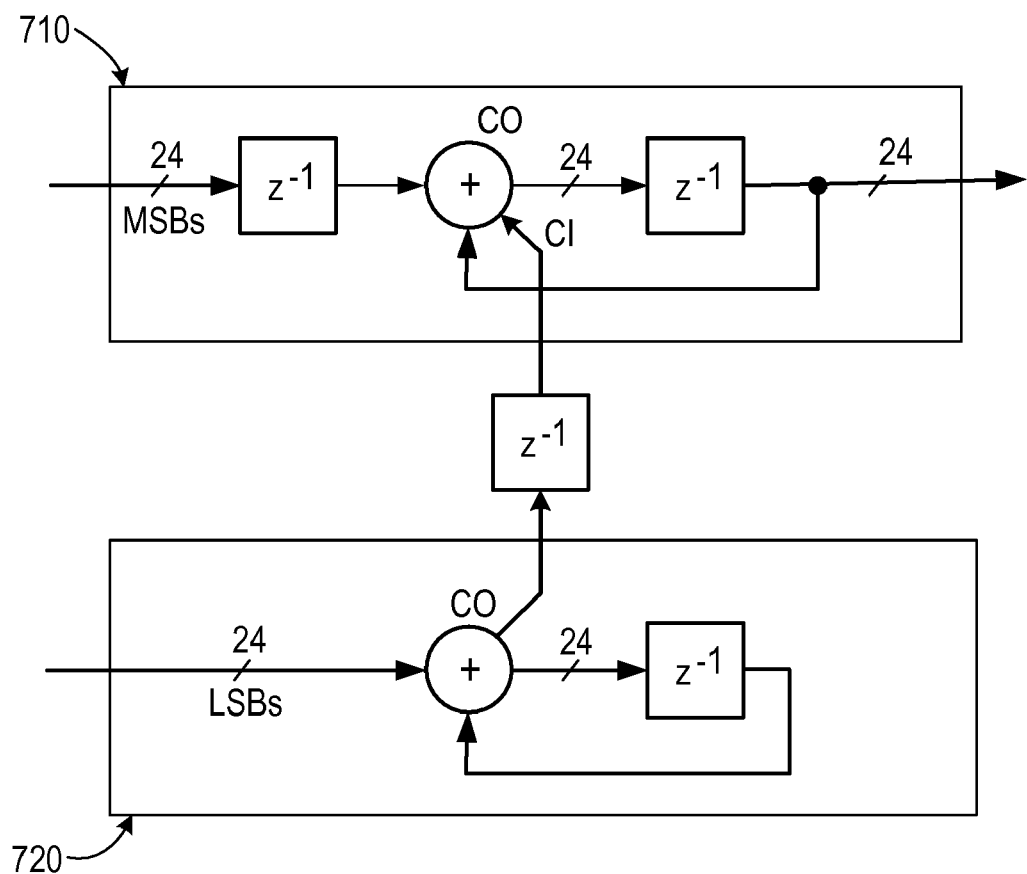
FIG. 7 shows a fourth pipelined digital accumulator.

FIG. 7 shows an implementation of the present invention where the LSB data is not required. While 24 bits is shown in each of the upper 710 and lower 720 partitions, this split is arbitrary and shown as an example only. In the case where the lower partition bits are not needed as part of the accumulator output, output latency compensation registers are not needed for lower partition 720. This implementation may be used when for example a value with a fixed number of fractional bits is being accumulated, but only the integer portion of the accumulated result is needed.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A parallel digital accumulator having a plurality of parallel input bits and a plurality of output bits comprising:
    a plurality of partitions ordered from the most significant partition to the least significant partition, each partition having a predetermined number of input bits and the same number of output bits, a register holding the predetermined number of bits, an adder adding the bits held from the register output to the input bits and feeding the sum to the register input, the register output feeding the output bits, the only communication between partitions being the carry out signal generated by the lesser significant partition communicated through a delay element to the carry input of the more significant partition;
    wherein at least one of said registers delivers said predetermined number of output bits held therein to a device external to said accumulator; and
    wherein each of said adders operates at a predetermined adder speed, each adder requiring one clock period to perform one of said additions; and
    wherein said output bits are delivered to said external device at said predetermined adder speed, a result for an addition in each partition being delivered at a rate of one per clock period.

2. The parallel digital accumulator of claim 1 where the number of partitions is two.

3. The parallel digital accumulator of claim 2 where the two partitions have the same number of bits.

4. The parallel digital accumulator of claim 2 where the two partitions have a different number of bits.

5. The parallel digital accumulator of claim 2 where the most significant partition further comprises a delay element between the parallel input bits and the input to the adder, and the least significant partition further comprises a delay element between the output of the register and the parallel output bits.

6. The parallel digital accumulator of claim 2 where the most significant partition further comprises a delay element between the parallel input bits and the input to the adder, and the output bits of the least significant partition are not used in further computation.

7. The parallel digital accumulator of claim 1 where the number of partitions is more than two.

8. The parallel digital accumulator of claim 1 where each partition has one bit.

9. The parallel digital accumulator of claim 1 where each partition has a plurality of bits.

10. The parallel digital accumulator of claim 1 where each partition except the least significant partition further comprises a delay element between the input bits and the adder.

11. The parallel digital accumulator of claim 1 where each partition except the most significant partition further comprises a delay element between the output of the register and the output bits.

12. The parallel digital accumulator of claim 1 where the number of output bits is less than the number of input bits.

* * * * *